United States Patent [19]

Inagaki et al.

[11] Patent Number: 4,896,354

[45] Date of Patent: Jan. 23, 1990

[54] IMAGE RECEPTION SYSTEM

[75] Inventors: Isamu Inagaki; Haruo Aoki, both of Kanagawa, Japan

[73] Assignee: Sony Corporation, Tokyo, Japan

[21] Appl. No.: 786,802

[22] Filed: Oct. 11, 1985

[30] Foreign Application Priority Data

Oct. 12, 1984 [JP] Japan .................... 59-213645

[51] Int. Cl.[4] .............................. H04N 7/167
[52] U.S. Cl. ........................... 380/7; 380/20; 358/349
[58] Field of Search ........... 358/114, 86, 122, 123, 358/349; 380/7, 10, 20

[56] References Cited

U.S. PATENT DOCUMENTS

| 4,245,245 | 1/1981 | Matsumoto | 358/123 |
|---|---|---|---|
| 4,317,213 | 2/1982 | DiLorenzo | 358/114 |
| 4,530,008 | 7/1985 | McVoy | 380/20 |
| 4,536,791 | 8/1985 | Campbell et al. | 358/114 |
| 4,599,647 | 7/1986 | George et al. | 358/122 |
| 4,600,921 | 7/1986 | Thomas | 380/20 |
| 4,605,961 | 8/1986 | Frederiksen | 380/20 |
| 4,620,229 | 10/1986 | Amano et al. | 380/20 |
| 4,685,131 | 8/1987 | Horne | 380/20 |

FOREIGN PATENT DOCUMENTS 112575  7/1984  European Pat. Off. .

Primary Examiner—Stephen C. Buczinski
Assistant Examiner—Linda J. Wallace
Attorney, Agent, or Firm—Hill, Van Santen, Steadman & Simpson

[57] ABSTRACT

An image reception system is disclosed, which includes a tuner for selecting one of broadcast channels of CATV, a video detector connected to the tuner for deriving output signals having video signals and command data of the selected channel, a data fetch circuit for extracting the command data and character data out of the output signals derived from the video detector, a display controller for controling video outputs to be displayed on a display screen, and a key pad for supplying the control command to the display controller. In this case, the display controller includes a character generator for generating character signals to be displayed on the display and masking circuit for superimposing masking signals on the video signal on request.

4 Claims, 3 Drawing Sheets

IMAGE RECEPTION SYSTEM

BACKGROUND OF THE INVENTION

1. Field of the Invention

This invention relates generally to an image reception system and is directed more particularly to an image reception system in which image information is transmitted through a cable, such as in a commercial cable television system.

2. Description of the Prior Art

As is well known, in prior art image reception systems such as CATV (cable television) systems, a reception block control is provided for a particular viewer or user. Such reception blocks are often applied to programs that parents consider harmful for their children (parental control), or to programs for which the user has not yet paid a listening fee. When such reception block is effected, it is usual to mask the picture screen or to scramble the picture.

Various modes for carrying out such reception blocks and the controls therefore may be considered. For example, the reception block control may be carried out from the transmitting side, or the user may carry out the reception block control by himself, or the reception block control may be made automatically because the user has not yet paid an enabling reception contract fee. Accordingly, when such reception block controls are made because of such differing reasons, it is very difficult for the user to anticipate, or figure out what operation must be made next to implement his desires for service.

OBJECTS AND SUMMARY OF THE INVENTION

Accordingly, it is an object of this invention to provide an image reception system by which the reason for a reception block condition can be understood easily and rapidly so that the user can enter the next operation easily.

It is another object of this invention to provide an image reception system which is suitable in the use of a CATV system or the like.

According to one aspect of the present invention, there is provided an image reception system comprising:

tuner means for selecting one of the available broadcast channels;

video detector means connected to said tuner means for deriving output signals having video signals and command data of the various selected channels;

data fetch means for extracting said command data and character data out of said output signals derived from said video detector means;

display control means for controlling video outputs to be displayed on a display screen; and key pad means for supplying a control command to said display control means, characterized in that said display control means includes character generator means for generating character signals to be displayed on said display, and masking means for superimposing masking signals on said video signals on request.

These and other objects, features and advantages of the image reception system according to the present invention will become apparent from the following detailed description of the preferred embodiment taken in conjunction with the accompanying drawings, throughout which like reference numerals designate like elements and parts.

DESCRIPTION OF THE PREFERRED EMBODIMENT

An embodiment of the image reception system according to this invention will hereinafter be described in detail with reference to FIGS. 1 to 8.

Figure 1:
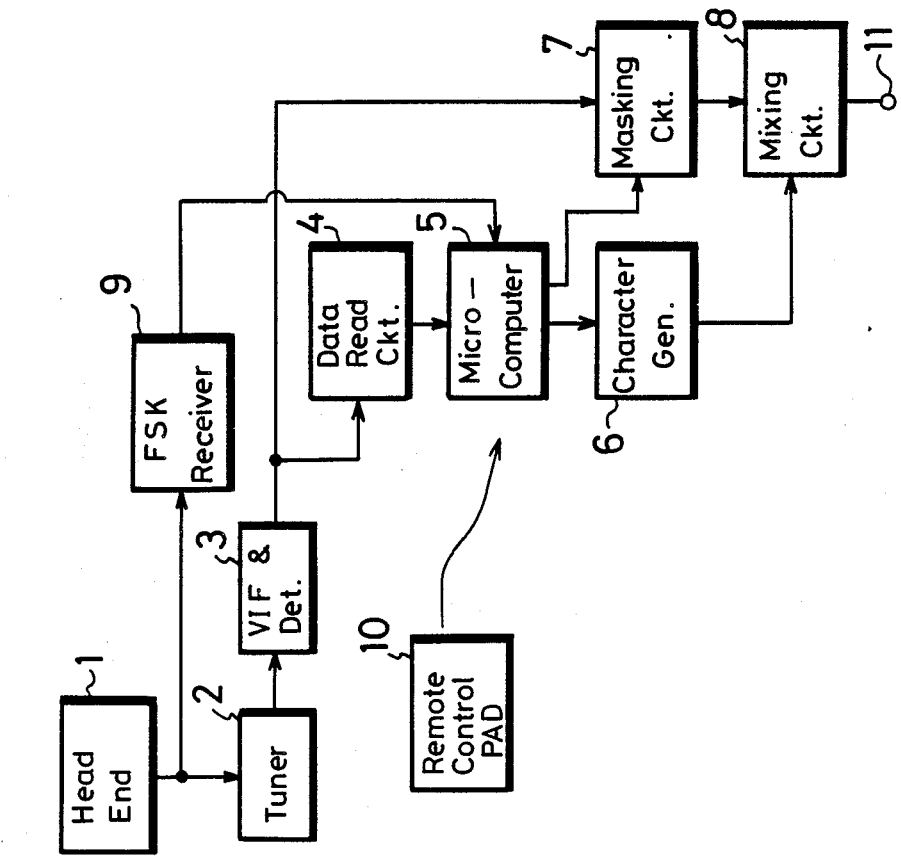
FIG. 1 is a circuit block diagram showing an embodiment of an image reception system according to this invention.

FIG. 1 is a circuit block diagram showing an embodiment of the image reception system according to the present invention. In FIG. 1, reference numeral 1 designates a transmitting side or front end which transmits on-screen display information together with a video program, numeral 2 is a tuner which is supplied with the output from the front end 1, numeral 3 is a video detector including a video intermediate frequency amplifier which amplifies the output from the tuner 2, numeral 4 is an IN BAND DATA read-in circuit for reading therein IN BAND DATA such as, reception block control data, scramble data, or the like, out of the output delivered from the amplifier 3, and numeral 5 is a microcomputer for use in reception block control to which the output from the IN BAND DATA read-in circuit 4 is supplied. Reference numeral 6 designates a character generator and display controller for generating character signals and controlling the display on the basis of the command data from the microcomputer 5, and 7 is a blanking or masking circuit for superimposing a masking signal on the video signal from the video detector 3 on the basis of the command data derived from the microcomputer 5, to thereby blank the video signal. Reference numeral 8 designates a mixing circuit for mixing the character information from the character generator and display controller 6 and the output from the masking circuit 7, and 9 and FSK (frequency shift keying) receiver for receiving an OUT BAND DATA such as an emergency broadcast data and so on from the front end 1. The output from the FSK receiver 9 is also supplied to the microcomputer 5.

Figure 2:
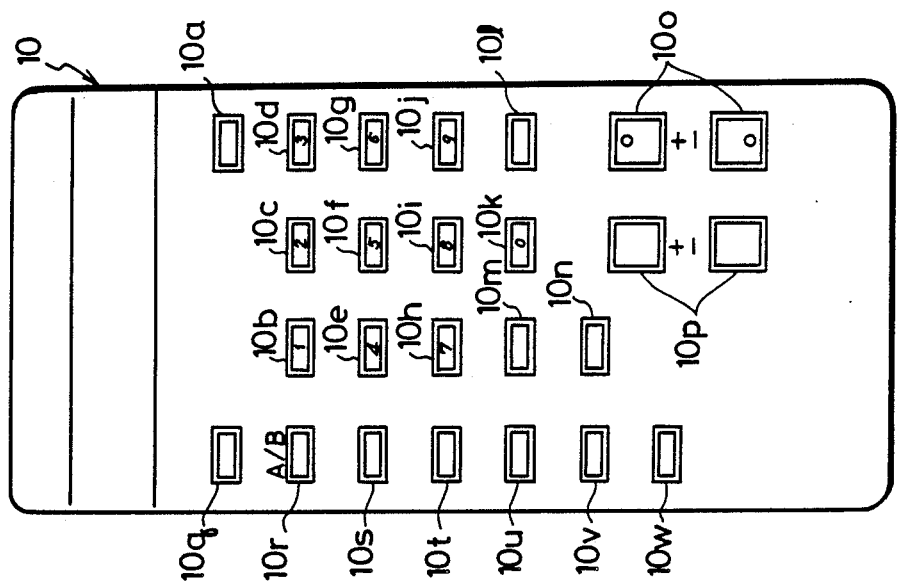
FIG. 2 is a front view showing an example of a remote control pad used in the present invention.

Reference numeral 10 designates a remote control pad for remote-controlling the microcomputer 5. As, for example, shown in FIG. 2, this remote control pad 10 is provided with a plurality of operation keys corresponding to various kinds of functions that the image reception system of the invention has. In FIG. 2, reference numeral 10a designates a power on-off key, 10b to 10k comprise ten keys for the user to enter the channel number and to enter a desired block code (four figures), and 10l comprises a channel-enter key. After the ten keys 10b to 10k are depressed by the user in accordance with the channel number that the user wants to select, the channel enter key 10l is depressed. Then the predetermined portion, for example, an upper right-hand portion on the screen of a display apparatus (such as a television set, not shown). Reference numeral 10m designates a channel key by which the television channel now being viewed is displayed on the screen. Reference numeral 10n designates a code enter key. After the keys corresponding to a reserved block code are depressed and selected from the keys 10b to 10k, the code enter key 10n depressed. In this embodiment, four designated figures are entered as the identification code.

Reference numeral 10o designates channel keys for making the channel selection go up and down, 10p designates sound volume keys for increasing and/or decreasing the sound volume; 10q comprises a muting key for changing over the muting state of the sound, 10r comprises a cable switching key for changing over the CATV cables, and 10s comprises a block set key. As will be described later, if this block set key 10s is depressed, after the code registration or code verification, the channel now being selected is blocked, or the reception thereof is blocked. Reference numeral 10t designates a block clear key, and, if this block clear key 10t is depressed, after the code verification the corresponding channel is released from being blocked.

Reference numeral 10u designates a key for selecting normal television, and if this key 10u is depressed, the normal television picture can be viewed. Reference numeral 10v designates a CADA (cable digital audio) key and if this CADA key 10v is depressed, an audio signal from the CADA system can be received. Reference numeral 10w designates a key for a television game, and if this key 10w is depressed, it becomes possible to play a television game.

When various kinds of these keys are depressed, the various information from the remote control pad 10 are interpreted by the microcomputer 5 and in accordance with the information, the microcomputer 5 controls the respective circuits. In other words, the microcomputer 5 interprets not only the information from the transmitting side 1 but also the information from the remote control pad 10 to thereby carry out the control operation thereof.

An output terminal 11 exits from the mixing circuit 8. When the blanking or masking circuit 7 is controlled by the microcomputer 5 to superimpose the masking signal on the video signal derived from the video detector 3, or blank the video signal, only the character information from the character generator and display controller 6 is delivered to the output terminal 11.

When a video signal on which a block control data is superposed is transmitted from the transmitting side 1, this video signal is received by the tuner 2 and then converted to a video signal by the video detector 3. The block control data in this video signal is read in and detected by the IN BAND DATA read-in circuit 4 and then fed to the microcomputer 5. On the basis of the data concerning the block control information supplied thereto, the microcomputer 5 controls the character generator and display controller 6 so as to produce the character information and also controls the masking circuit 7 to blank the video signal applied thereto. As a result, there is supplied to the mixing circuit 8 only the character information from the character generator and display controller 6. This transmitted character information is displayed in the form as, for example, shown in FIG. 3, on an image display apparatus (not shown) such as a CRT cathode ray tube. At this time, the sound is automatically muted.

During this display period, the user cannot see the television picture. However, as will be described later, if the user's block code is entered by selecting appropriately from the ten keys and pressing the code enter key 10n, then if the input code and the previously registered code are coincident with each other, it becomes possible for the user to see the television picture.

Further, when the video signal on which the emergency broadcast data is superposed is transmitted from the transmitting side, such video signal is supplied through the tuner 2 and the video detector 3 to the masking circuit 7 as mentioned above, while the emergency broadcast data is received by the FSK receiver 9 and then fed to the microcomputer 5 as the OUT BAND DATA. Similarly as described above, on the basis of the data supplied thereto, the microcomputer 5 controls the character generator and display controller 6 to produce the character information or data and further controls the masking circuit 7 to blank the video signal applied thereto. As a result, only the character data derived from the character generator and display controller 6 is supplied to the mixing circuit 8 so that this character data is displayed as "EMERGENCY" on the blanked screen at its predetermined position., for example, at its central portion in a predetermined cycle, for example, in the cycle of 250 ms in a flushing manner by the image display apparatus (not shown). At this time, the sound is muted. In this case, it is possible that the video signal is not blanked but is delivered together with the character information.

When a tier level information which allows the reception of the video signal in accordance with the user's contract condition is superposed upon the video signal, on the basis of the tier level information passed through the tuner 2 and the video detector 3, there is detected a tier level at each television program by the IN BAND DATA read-in circuit 4.

On the other hand, a tier level at every home is detected by the FSK receiver 9 and the both detected outputs are supplied to the microcomputer 5, in which they are compared with each other. At this time, if the program now being received belongs to the tier level, the video signal is delivered to the output terminal 11. If the television program now being received does not belong to the tier level, the microcomputer 5 controls the masking circuit 7 to blank the video signal applied thereto and also controls the character generator and display controller 6 to produce the character data indicative of the non-tier level. As a result, only the character data from the character generator and display controller 6 is transmitted to the mixing circuit 8 so that this character data is displayed on the masked screen at its predetermined position, for example, the upper right-hand position as the display of channel and "NOT AUTHORIZED" is displayed at the central portion of the screen by the image display apparatus (not shown). At this time, the sound is muted.

When the above three kinds of information are transmitted from the transmitting side 1, they are displayed dominantly from any other information.

Operation of the block display and the setting method by the remote control pad 10 will be described with reference to FIGS. 4 to 8.

(A) Code registration

Figure 4:
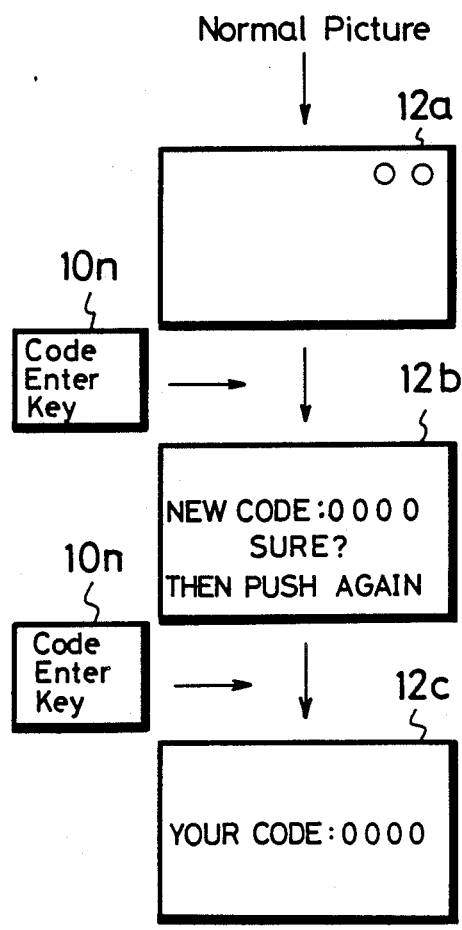

A normal television picture is displayed as shown in FIG. 4 and then a desired block code (four figures) that the user wants to register is entered by using the ten keys. For example, if the code is 1234, the ten keys 10b, 10c, 10d, and 10e are depressed in sequence. In this case, in order to remove the disadvantage upon displaying the channel, the display is made on the upper right hand position of a screen 12a in the two figures. Accordingly, the display is changed in the order of 01→12→23→34.

Next, when the code enter key 10n is depressed within a predetermined time, for example, within about three seconds later, the display on the screen is changed as shown in a screen 12b. At this time, while the sound is not muted, the picture except the characters is masked. Then, after a predetermined time, for example, about four seconds, the picture screen is returned to the ordinary picture screen. Accordingly, in this case, the code is not registered. On the other hand, when the code enter key 10n is depressed within a predetermined time, for example, within about four seconds, the code is registered and the display is made as shown by a screen 12c. At this time, while the sound is not muted, the picture other than the characters, is masked. Then, after a predetermined time, for example, about four second later, the picture screen is returned to the normal picture screen. In this case, if the code registration is carried out previously, the following code verification operation becomes necessary.

(B) Code verification

Figure 5:
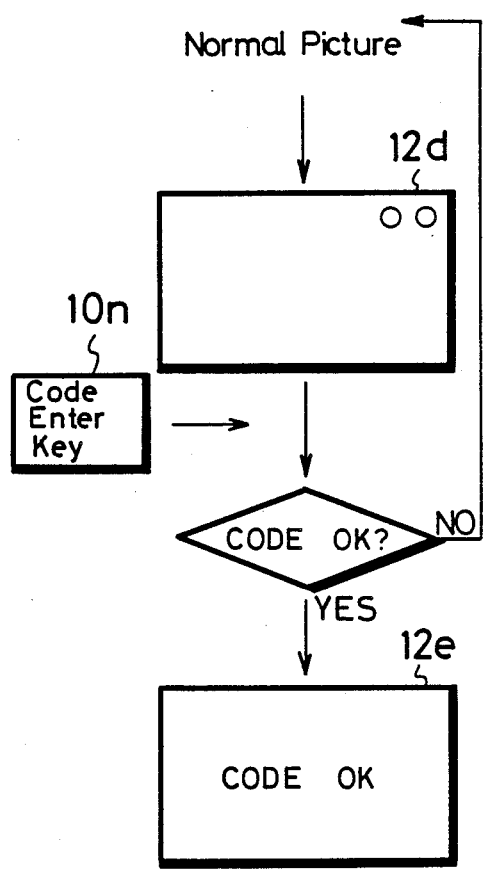

At first, the normal picture is displayed as shown in FIG. 5 and the user's block code is entered by using the ten keys. Then, the code is displayed on the upper right hand position of a screen 12d.

Next, when the code enter key 10n is depressed, it is judged whether the input code coincides with the registered code or not. If they are coincident, the character information "CODE OK" is displayed as shown by a screen 12e. Under this state, also the picture other than the characters is displayed. If not, the program is returned to the step of normal picture. Then, after a predetermined time, for example, after about four seconds, the characters are erased. In this case, the verification of the normal channel is used when the block channel registration and the code correction are carried out as will be described later.

Figure 6:
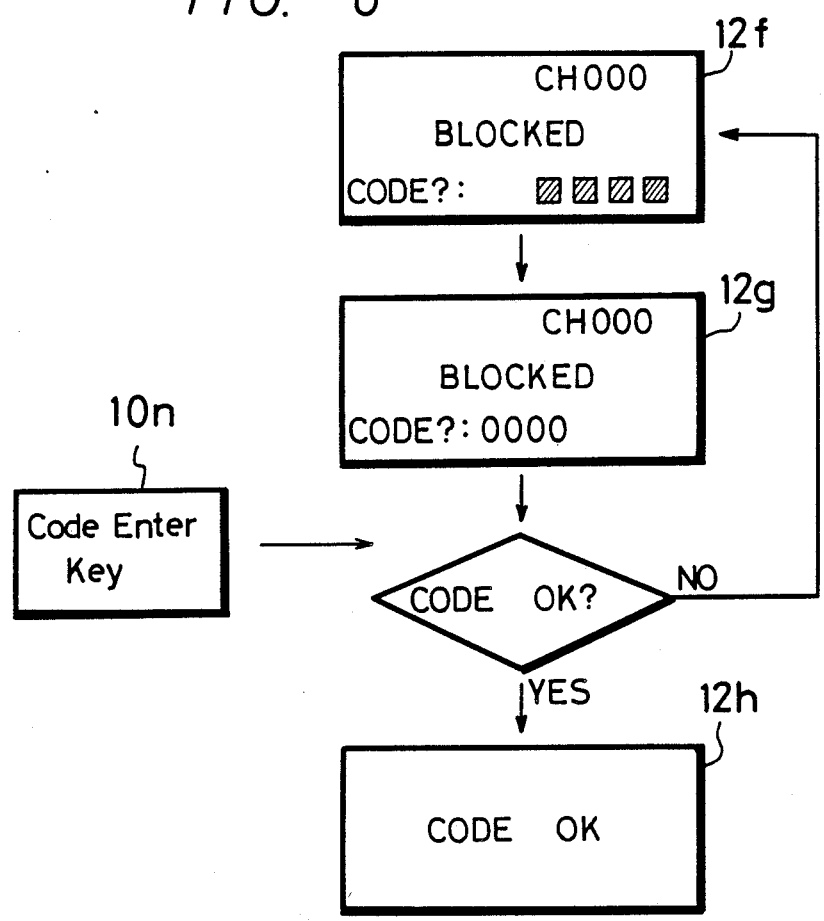

Further, if a channel which is previously blocked is selected by using the ten keys 10b to 10k and the channel enter key 10l or the channel key 10o, such a screen 12f as shown in FIG. 6 is displayed. Under this state, the pictures except the characters are masked and the sound is muted too. Next, if the user's code is entered by selecting from the ten keys, the code number is entered and the display is changed as shown by a screen 12g.

Next, if the code enter key 10n is depressed, it is judged whether the input code is coincident with the registered code or not. If they are coincident with each other, the character data "CODE OK" is displayed as shown by a screen 12h. Then, the masking of the picture screen and the muting of the sound are both released and after a predetermined time, for example, about four seconds later, the characters are erased. If not, the program is returned to the step at which the screen 12f is to be displayed.

(C) Block channel registration

At first, the channel that the user wants to block is selected and then the code verification is carried out in accordance with the procedure of the above-described (B).

Figure 7:
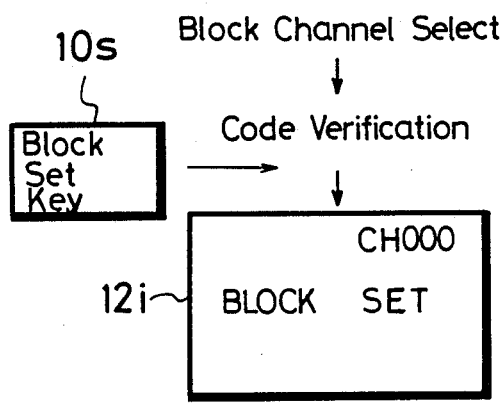

Next, when the block set key 10s is depressed, such a screen 12i as shown in FIG. 7 is displayed. At this time, although the sound is not muted, the pictures, except the characters are masked. In this case, the channel, which is displayed on the upper right hand side of the screen, is blocked. Then, after a predetermined time, for example, after about four seconds, the displayed picture screen is returned to the normal picture screen. Accordingly, even when the channel is changed over next time or the power source is switched on, the registered channel has been still blocked.

(D) Block channel cancel

At first, the blocked channel is selected and the code verification is carried out in accordance with the procedure described in the above (B).

Figure 8:
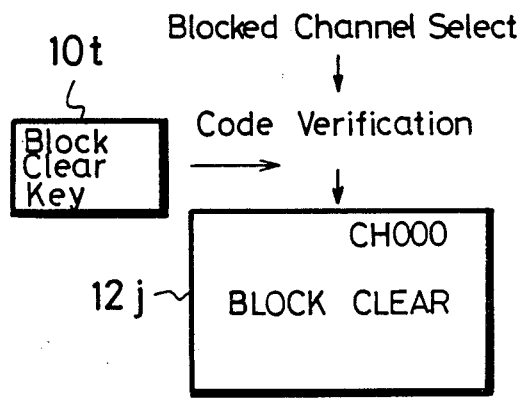

Next, when the block clear key 10t is depressed, such a picture screen 12j as shown in FIG. 8 is displayed. At this time, although the sound is not muted, the picture except the characters is masked. Then, after a predetermined time, for example, after about four seconds, the picture screen is returned to the normal picture screen and the registered block channel is canceled.

(E) Code correction

At first, the code verification is carried out in accordance with the procedure (B) and then a new code is registered in accordance with the procedure (A).

As described above, the block display and the setting thereof can be carried out by the remote control pad 10.

Figure 3:
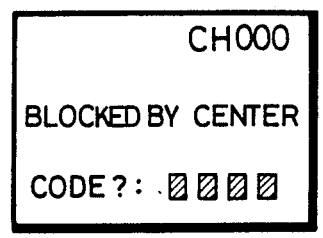
FIGS. 3 to 8 are respectively diagrams useful for explaining the present invention.

When the reception block data as shown in FIG. 3 is transmitted from the transmitting side, if the user wishes to release this reception block control, it is sufficient for the user to carry out the operation in accordance with the procedure (B). Thus the picture screen blocked by the transmitting side can be seen.

As set forth above, according to this invention, since the on-screen display information from the transmitting side is received and then interpreted, the content of such information is displayed as characters on the screen of the CRT and the on-screen display can be also controlled by the operation of the remote control pad at the receiving side, the reason the reception of the channel is blocked will be known instantaneously by just viewing the screen so that the user can enter a next operation step easily. Further, control of the reception block set by the user and control of the reception block control set by the transmitting side can be easily accomplished by the remote control pad while observing the on-screen display information.

Further, the character pattern prepared by the receiving side can be displayed on the screen by an instruction from the transmitting side, and all the channels that can be received can be subjected to the reception block state.

Furthermore, in other cases than the reception block control, such as an emergency broadcast, it is also possible to use the on-screen display command by the transmitting side.

In addition, since the processing is carried out fully in the electronic fashion, no matter what command the transmitting side transmits, the user can cope with such command by one remote control pad.

The above description sets forth a single preferred embodiment of the invention but it will be apparent that many modifications and variations could be effected by one skilled in the art without departing from the spirit of scope of the novel concepts of the invention. Accordingly, the scope of the present invention should be determined by the scope of the appended claims.

We claim as our invention:

1. An image reception system comprising:
   tuner means for selecting one of a plurality of broadcast channels;
   video detector means connected to said tuner means for deriving output signals corresponding to video signals and command data of the selected channel;
   data fetch means connected to said video detector means for producing signals representative of command data and character data for on-screen display in response to said video output signals from sand video detector means;

command analyzing and display control means connected to said data fetch means for controlling video outputs to be displayed on a display screen;

key pad means for supplying a control command to said display control means;

said display control means including character generator means for generating character signals to be displayed on said display screen, masking means connected to said video detector means and to said command analyzing and display control means for selectively superimposing masking signals on said video signals for blanking said video signals, in accordance with command data, and character generator means connected to said command analyzing and display control means for generating character signals indicating types of reception blocking operations in accordance with said command data, said character signals being superimposed on said masked video signals.

2. An image reception system as recited in claim 1, wherein said display control means includes a microcomputer which selects said character information based on said command data or said control command.

3. An image reception system as recited in claim 1, wherein said masking means is controlled by said control command from said key pad means.

4. An image reception system as recited in claim 3 including means, wherein the control of said masking means requires the user to input a predetermined ID code.

* * * * *